United States Patent [19]

Ishida

[11] Patent Number: 5,594,555
[45] Date of Patent: Jan. 14, 1997

[54] IMAGE PROCESSING METHOD AND APPARATUS EMPOLYING THE SAME

[75] Inventor: Shinichi Ishida, Tokyo, Japan

[73] Assignee: Canon Kabushiki Kaisha, Tokyo, Japan

[21] Appl. No.: 60,545

[22] Filed: May 13, 1993

[30]  Foreign Application Priority Data

May 19, 1992  [JP]  Japan ................................... 4-126113

[51] Int. Cl.$^6$ ............................. H04N 1/21; H04N 1/40; H04N 1/393
[52] U.S. Cl. ...................... 358/448; 358/296; 358/298; 358/447; 358/443; 358/445; 358/451
[58] Field of Search .................................. 358/447, 443, 358/448, 445, 451, 296, 298; 382/47, 22, 299; 395/128

[56]  References Cited

U.S. PATENT DOCUMENTS

| | | | |
|---|---|---|---|
| 4,682,869 | 7/1987 | Itoh | 358/447 |
| 4,817,174 | 3/1989 | Nakatani | 358/283 |
| 4,866,533 | 9/1989 | Nagashima | 358/443 |
| 4,876,604 | 10/1989 | Nobuta | 358/400 |
| 5,019,916 | 3/1991 | Ogura | 358/401 |
| 5,086,487 | 2/1992 | Katayama | 358/426 |
| 5,130,820 | 7/1992 | Hirota | 358/447 |
| 5,257,114 | 10/1993 | Yoshida | 358/448 |
| 5,267,052 | 11/1993 | Bannai | 358/444 |
| 5,271,072 | 12/1993 | Yoshida | 358/451 |

OTHER PUBLICATIONS

Aldus Photostyler Jun. 1992 Second Edition Copyright U–Lead Systems. Inc. 1990–1991.

*Primary Examiner*—Sandra L. O'Shea
*Assistant Examiner*—John Ning
*Attorney, Agent, or Firm*—Fitzpatrick, Cella, Harper & Scinto

[57]  ABSTRACT

An image processing apparatus obtains image data with a low resolution by processing a plurality of pixel values read in with a high resolution into one pixel value, for the low resolution mode. Thereby, the image processing apparatus is able to transmit unfailingly image data needed for reproduction of a narrow line in a document even during a low-resolution mode. Further, in accordance with a resolution mode that is currently selected, an image processing apparatus adjusts the ratio between the amount of edge enhancement with respect to the main scanning direction and the amount of edge enhancement with respect to the sub-scanning direction, thus unfailingly including the image data needed for reproduction of a narrow line extending in the main and/or sub-scanning direction.

10 Claims, 6 Drawing Sheets

IMAGE PROCESSING METHOD AND APPARATUS EMPLOYING THE SAME

BACKGROUND OF THE INVENTION

1. Field of the Invention

The present invention relates to an image processing apparatus, such as a digital copying machine or a facsimile apparatus, and an image processing method employed in the image processing apparatus. More particularly, the present invention relates to an image processing method which is able to output input data at a desired resolution and an apparatus employing the same.

2. Description of the Related Art

A known image processing apparatus, such as a facsimile apparatus, reads a document or image by using an image sensor, such as a CCD, and compresses the output signal from the image sensor into binary data by binary processing in order to transmit the image data to a communication partner.

FIG. 2 is a block diagram of an example of signal processing as mentioned above. A reading unit 201 for reading a document (carrying characters, images or the like) comprises: a light source for irradiating a document; a CCD or another photoelectric converting device for converting image information representing the document to electric signals; and a conveyer means for conveying the document in the sub-scanning direction. The analog signal output by the reading unit 201 is quantized into a digital signal by an A/D converter 202. The multi-value digital signal (plural bits per pixel) from the A/D converter is compressed into binary (black and white) data by a binary processing unit 203.

A normal-type facsimile apparatus provides three reading resolutions with respect to the sub-scanning direction: 3.85 lines/mm (standard (STD) mode); 7.7 lines/mm (fine (FINE) mode); and 15.4 lines/mm (super-fine (SF) mode), which can be selectively used.

A user can select a suitable reading resolution by operating an operating unit 204.

Reading of a document by the CCD is synchronized with an XSH signal which is an interrupt signal issued by a CPU 205. Let it be assumed that an XSH signal is issued every two milliseconds. Then, image data of one scanning line can be read in with the resolution of 15.4 lines/mm in two milliseconds. Since one line of FINE resolution mode (FINE-mode line) corresponds to two lines of SF resolution mode (SF-mode lines), image data for one FINE-mode line is obtained for every two XSH signals. Similarly, image data for one STD-mode line is obtained for every four XSH signals. FIG. 3 indicates the relation between XSH signals and data carried by CCD signals during STD mode, showing that four lines of image data are read in to obtain image data for one STD-mode line. As shown in FIG. 3, an XLST signal is issued for every four XSH signals, and one line of image data immediately after an XLST signal has been issued is recognized as valid data, which then is binarized. The other three lines of image data are treated as invalid.

In the FINE mode, image data for one FINE-mode line is obtained for every two lines of image data which are read in, that is, an XLST signal is issued for every two XSH signals. The line of image data immediately after an XLST is valid, and the other line of image data is treated as invalid.

Problems of the above known art will be described with reference to FIG. 4. In the STD mode, as indicated by the STD-mode pixel size of 8 dots/mm×3.85 lines/mm (a unit pixel in the main scanning direction×a unit pixel in the sub-scanning direction), only data of one line out of every four lines that are scanned is validated, and the data of the other three lines is invalidated. If the invalidated data contains a piece of effective information, thus, the validated data lacks it, and so this processing causes a reduction of image quality. Similarly, during operation in the FINE mode, if invalidated data, which occurs every other line, contains a piece of effective information, the image quality will accordingly deteriorate.

SUMMARY OF THE INVENTION

The present invention is intended to eliminate the above problems of the known art. An object of the present invention is to provide an image processing method and apparatus, which even during operation in a low-resolution mode, can transmit image data or perform copying without causing deterioration of image quality.

Another object of the present invention is to provide an image processing method and apparatus which can unfailingly obtain image data of a fine (or narrow) line so as to achieve a high-quality binary image.

A facsimile apparatus according to one aspect of the present invention performs document-scanning with a resolution of 15.4 lines/mm and copying or transmission with any one of three resolutions, that is, 15.4 lines/mm (SF mode), 7.7 lines/mm (FINE mode) or 3.85 lines/mm (STD mode). During operation in the FINE mode, the facsimile apparatus scans a document with a resolution of 15.4 lines/mm, obtains a pixel value as the mean value of the values of two pixels aligned consecutively in the sub-scanning direction, and binarizes the thus-obtained pixel value. During operation in the STD mode, the facsimile apparatus scans a document with a resolution of 15.4 lines/mm, obtains a pixel value as the mean value of the values of four pixels aligned consecutively in the sub-scanning direction, and binarizes the thus-obtained pixel values.

A facsimile apparatus according to another aspect of the present invention performs document-scanning with a resolution of 15.4 lines/mm and copying or transmission with any one of three resolutions, that is, 15.4 lines/mm (SF mode), 7.7 lines/mm (FINE mode) or 3.85 lines/mm (STD mode). In the FINE mode, the facsimile apparatus scans a document with a resolution of 15.4 lines/mm, adopts the lower brightness or higher density value of the values as between two pixels aligned consecutively in the sub-scanning direction, and binarizes the thus-obtained pixel value. In the STD mode, the facsimile apparatus scans a document with a resolution of 15.4 lines/mm, adopts the lowest brightness or highest density value from among the values of four pixels aligned consecutively in the sub-scanning direction, and binarizes the thus-obtained pixel values.

Still another object of the present invention is to provide an image processing method and apparatus which, when the resolution with respect to the sub-scanning direction is reduced, increases the amount of edge with respect to the sub-scanning direction to be added to the value of each object pixel, to an amount that is larger than the amount of edge with respect to the main scanning direction to be added to the value of the same object pixel, thus achieving a high-quality image and, more particularly, unfailingly including image data for any regarding a fine (or narrow) horizontal line (extending in the main scanning direction) even during operation in the low-resolution mode.

A further object of the present invention is to provide an image processing method and apparatus which, when the resolution with respect to the main scanning direction is reduced, increases the amount of edge with respect to the main scanning direction to be added to the value of each object pixel to an amount that is larger than the amount of edge with respect to the sub-scanning direction to be added to the value of the same object pixel, thus achieving a high-quality image and, more particularly, unfailingly including image data for any fine (or narrow) horizontal line (extending in the sub-scanning direction) even during operation in the low-resolution mode.

Further objects, features and advantages of the present invention will become apparent from the following description of the preferred embodiments with reference to the attached drawings.

DETAILED DESCRIPTION OF THE PREFERRED EMBODIMENTS

Figure 1:
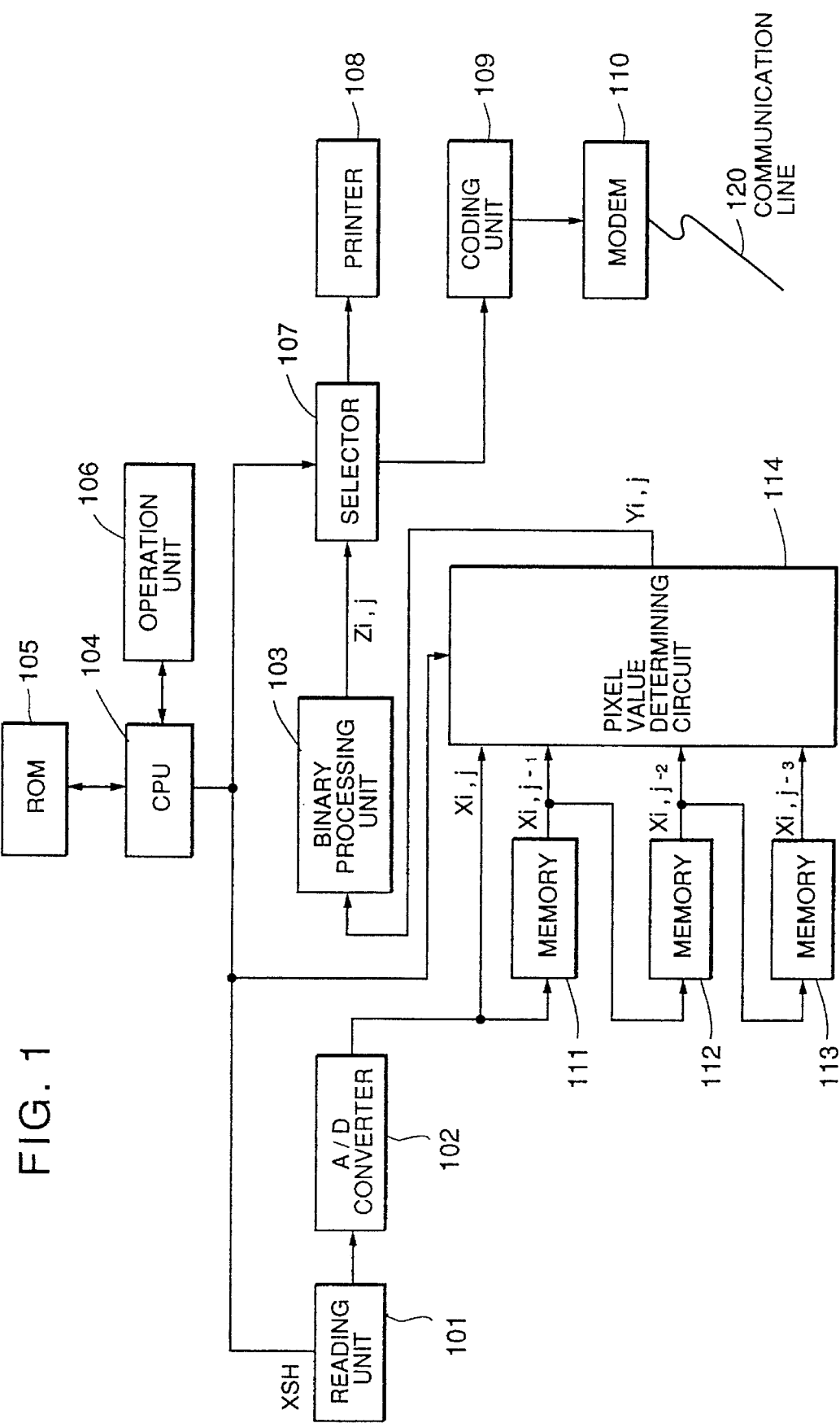
FIG. 1 is a block diagram of a facsimile apparatus according to first and second embodiments of the present invention.
Figure 2:
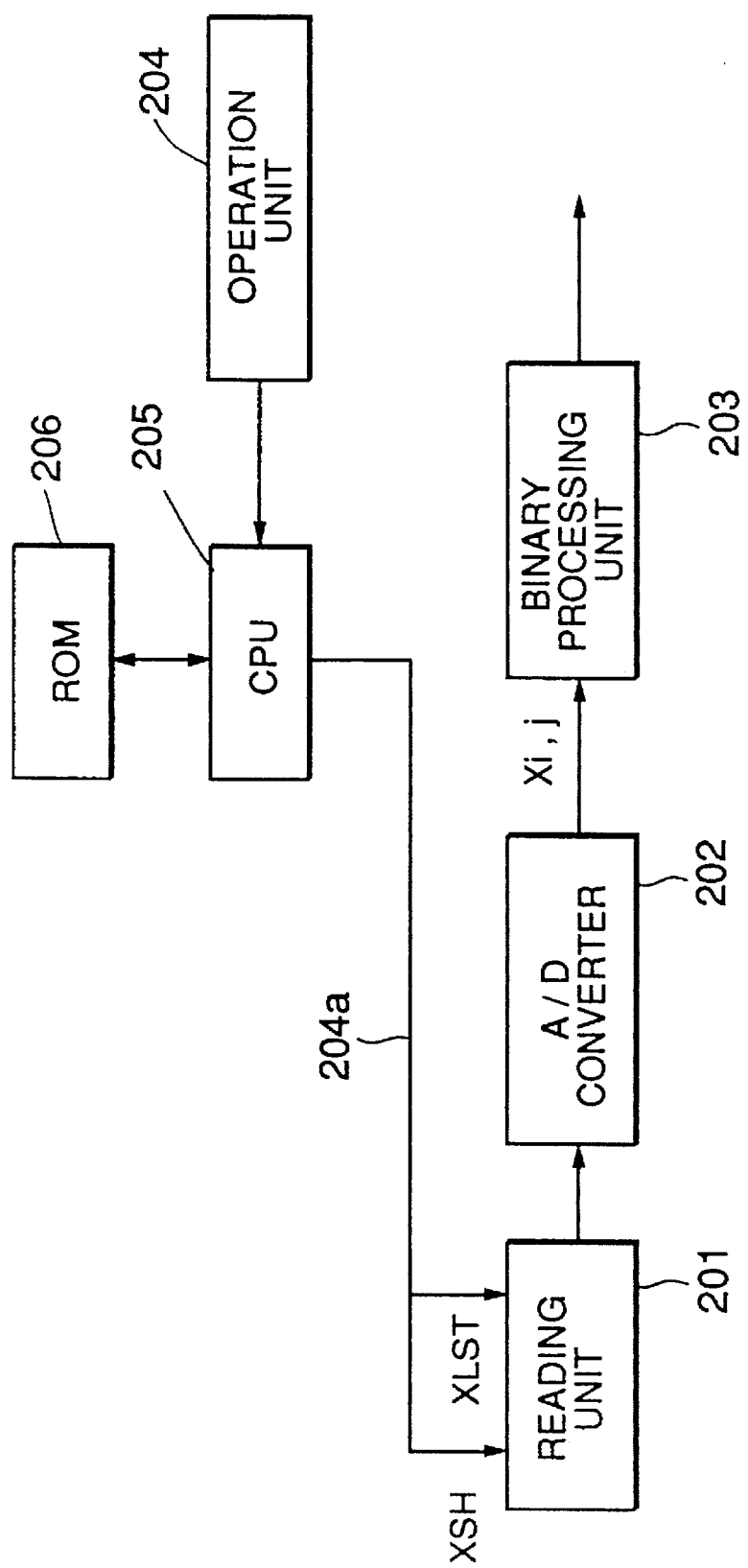
FIG. 2 is a block diagram of a conventional image processing apparatus.
Figure 3:
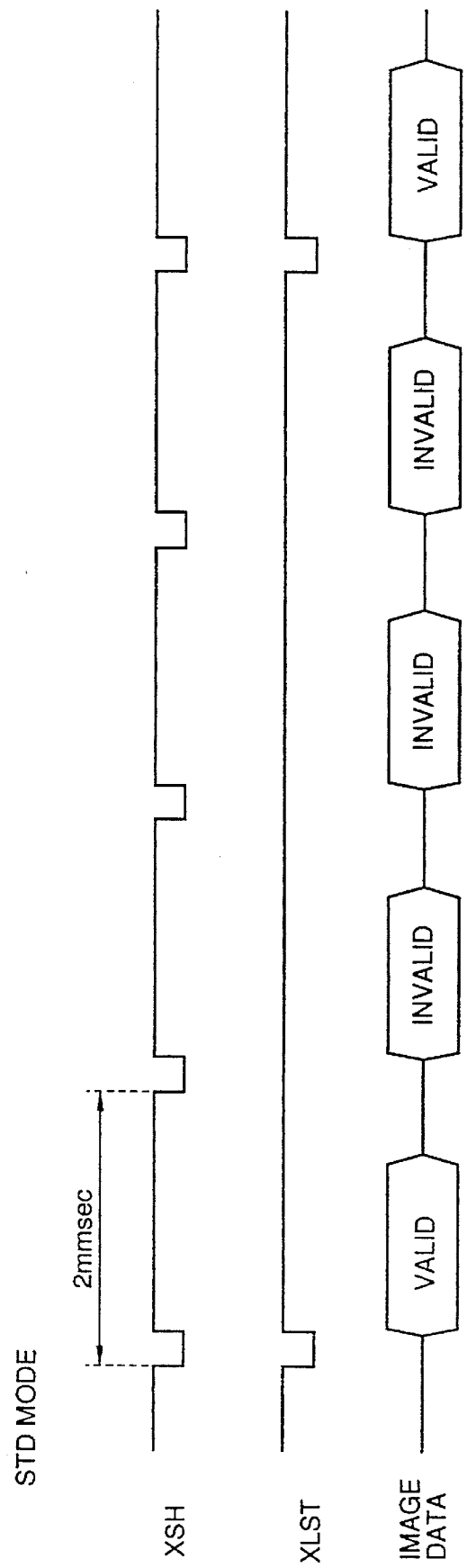
FIG. 3 shows timing of image data reading during operation in the STD mode.
Figure 4:
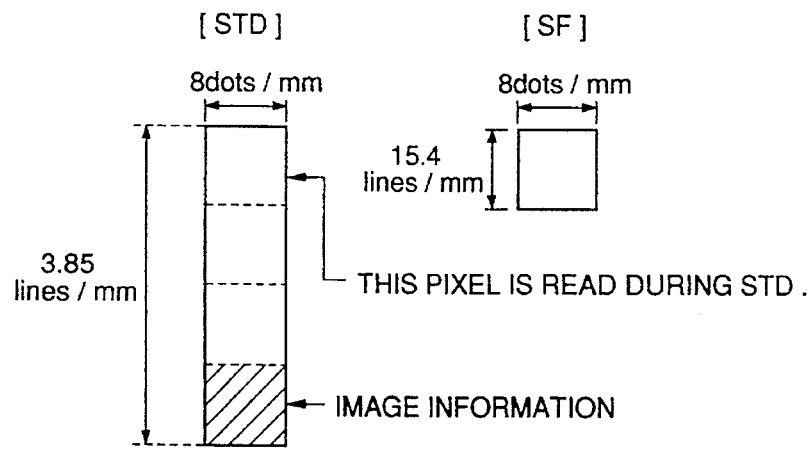
FIG. 4 illustrates the STD-mode pixel size and the SF-mode pixel size.

The preferred embodiments of the present invention will be described hereinafter with reference to the attached drawings.

FIRST EMBODIMENT

A facsimile apparatus according to the first embodiment of the present invention reads a document (carrying characters, images, etc.), quantizes the image data into binary data, and then outputs the binary image data to a printer or transmits the binary data through a modem. The facsimile apparatus according to the first embodiment will be described hereinafter in detail with reference to FIG. 1.

The facsimile apparatus of this embodiment comprises: a reading unit 101; an A/D converter 102; a binary processing unit 103; a CPU 104 for controlling the entire apparatus; a ROM 105 storing various programs for the CPU 104 to operate; an operating unit 106 having a display and keys for a user to input various instructions; a selector 107; a printer 108; a coding unit 109; a modem 110 enabling communication with a network via a communication line 120; FIFO (First-In-First-Out) memories (referred to as "memories" hereinafter) 111, 112 and 113; and a pixel value determining circuit 114.

Figure 5:
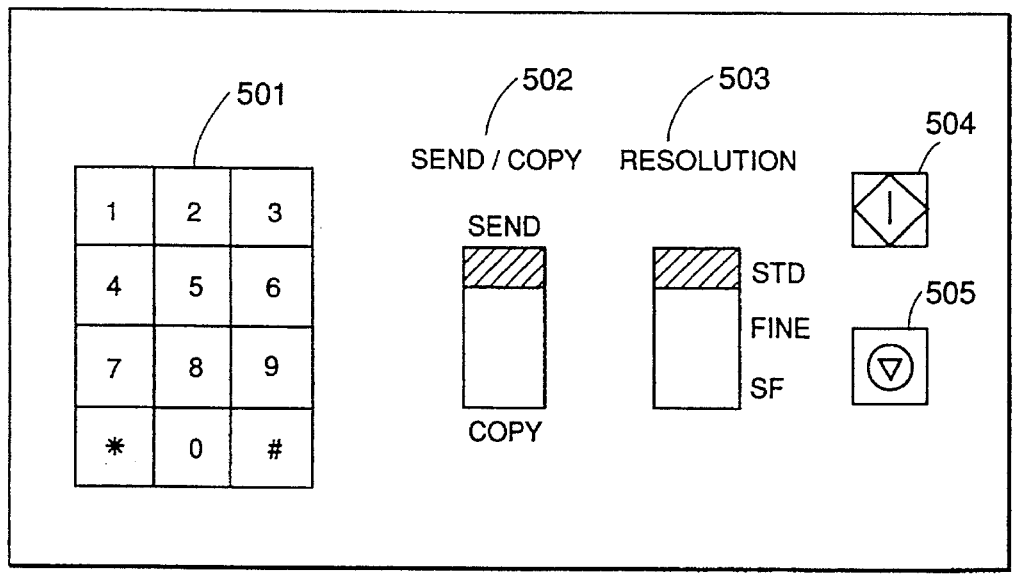
FIG. 5 is a plan view of the exterior of an operating unit.

As shown in FIG. 5, the operating unit 106 has: a ten-key pad 501; an operation select key 502 for selecting a send mode or a copy mode; a resolution select key 503 for selecting one of three resolution modes, that is, the SF mode (15.4 lines/mm), FINE mode (7.7 lines/mm), or STD mode (3.85 lines/mm); a start key 504; and a stop key 505.

The operation of the facsimile apparatus will now be described.

The reading unit 101 comprises: a light source for irradiating a document; a CCD or an other photoelectric converting device for converting image information of a document to electric signals; and conveyer means for conveying a document in the sub-scanning direction. The thus-constructed reading unit 101 scans a document. According to this embodiment, the scanning resolutions with respect to the main and sub-scanning directions are fixed to 8 dots/mm and 15.4 lines/mm, respectively, no matter which of the three resolution modes is selected.

The A/D converter 102 converts image data read by reading unit 101 to digital signals of six bits per pixel. The six-bit data provides 64 tone gradations; 000000 indicates the lowest brightness, that is, the darkest black, and 111111 indicates the highest brightness, that is, white.

Figure 6:
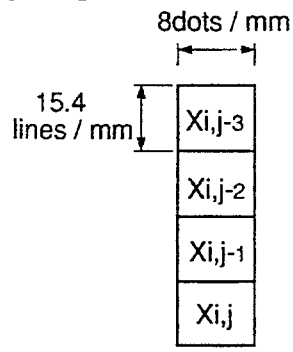
FIG. 6 illustrates an array of pixels in the sub-scanning direction.

A signal $X_{i,j}$ (i,j indicating the ith pixel (counted in the main scanning direction) of the jth scanning line (counted in the sub-scanning direction)) which has been quantized into 6 bits by the A/D converter 102 is written into the memory 111. Each of the memories 111, 112 and 113 has a capacity for storing image data of one scanning line. The memory 111 outputs $X_{i,j-1}$. The memory 112 inputs the signals output by the memory 111, and outputs $X_{i,j-2}$. The memory 113 inputs the signals output by the memory 112, and outputs $X_{i,j-3}$. FIG. 6 illustrates the positions of the pixels corresponding to $X_{i,j-3}$ to $X_{i,j}$.

The pixel values (indicated by the signals) $X_{i,j}$, $X_{i,j-1}$, $X_{i,j-2}$ and $X_{i,j-3}$ are input to the pixel value determining circuit 114, which performs the following operation.

If the STD mode is selected by the resolution select key 503 of the operating unit 106, the pixel value determining circuit 114 outputs $Y_{i,j}$, obtained as follows:

$$Y_{i,j}=(X_{i,j}+X_{i,j-1}+X_{i,j-2}+X_{i,j-3})/4$$

In brief, the pixel value determining circuit 114 outputs the mean value of the four values of the actual pixels shown in FIG. 6. Because the pixel value determining circuit 114 uses all the four actual pixel values to obtain one pixel value, the image data read in with the scanning resolution of 15.4 lines/mm can be converted to image data of a resolution of 3.85 lines/mm without neglecting any of the image data read in.

If the FINE mode is selected, the pixel value determining circuit 114 outputs $Y_{i,j}$, obtained as follows:

$$Y_{i,j}=(X_{i,j}+X_{i,j-1})/2$$

Because the pixel value determining circuit 114 outputs a pixel value obtained as the mean value of the two actual pixel values, the image data read in with the scanning resolution of 15.4 lines/mm can be converted to image data of a resolution of 7.7 lines/mm without neglecting any of the image data read in.

If the SF mode is selected, the pixel value determining circuit 114 outputs $Y_{i,j}$ obtained as follows:

$$Y_{i,j}=X_{i,j}$$

In other words, the input image data with the scanning resolution of 15.4 lines/mm is output as image data with a resolution of 15.4 lines/mm without any processing by the circuit 1114.

To summarize the above processing, the actual pixel values read in by scanning a document with the SF resolution (15.4 lines/mm) is converted to image data according to the current mode, that is, in the STD mode, by obtaining a pixel value as the mean value of the values of four pixels aligned consecutively in the sub-scanning direction, and in the FINE mode, by obtaining a pixel value as the mean value of two pixels aligned consecutively in the sub-scanning direction.

Then, a signal $Y_{i,j}$ output by the pixel value determining circuit 114 is transferred to the binary processing unit 103, which compresses the signal into binary data, that is, black or white, by using a fixed threshold TH. The binary processing circuit 103 determines a signal $Z_{i,j}$ by the following operation:

$$\text{If } Y_{i,j} \geq TH, \text{ then } Z_{i,j} = 0 \text{ (white)}$$

$$\text{If } Y_{i,j} < TH, \text{ then } Z_{i,j} = 1 \text{ (black)}$$

If the facsimile apparatus is provided with a half-tone mode and this mode is selected, the binary processing circuit 103 performs half-tone processing of the input data by using a known method, such as the error diffusion method or the dither method, before conversion to binary data.

The selector 107 sends the signal $Z_{i,j}$ to the printer 108 during operation in the COPY mode and to the coding unit 109 during operation in the SEND mode.

The printer 108 employs a known recording method, such as thermo-sensitive recording, laser beam recording or ink-jet recording. The coding unit 109 uses a known coding scheme, such as MH (modified Huffman) coding scheme, MR (modified READ) coding scheme, or MMR (modified modified READ) coding scheme, to code the binary data from the selector 107, and then sends the coded data to the modem 110. The modem 110 modulates the coded data and then outputs the data to the communication line 120.

As described above, a facsimile apparatus according to the first embodiment performs document-scanning with a resolution of 15.4 lines/mm and copying or transmission with any one of three resolutions, that is, 15.4 lines/mm (SF mode), 7.7 lines/mm (FINE mode) or 3.85 lines/mm (STD mode). In the FINE mode, the facsimile apparatus scans a document with a resolution of 15.4 lines/mm, obtains a pixel value as the mean of the values of two pixels aligned consecutively in the sub-scanning direction, and binarizes the thus-obtained pixel value. In the STD mode, the facsimile apparatus scans a document with a resolution of 15.4 lines/mm, obtains a pixel value as the mean of the values of four pixels aligned consecutively in the sub-scanning direction, and binarizes the thus-obtained pixel values. Thus, the facsimile apparatus according to this embodiment enhances the quality of a binary image of FINE and STD-mode resolutions (for example, substantially unfailingly reproduces a fine (or narrow) line), compared with a facsimile apparatus which obtains FINE or STD-mode image data by neglecting some of the image data read in with the SF-mode scanning resolution before binary processing, or a facsimile apparatus which obtains FINE or STD-mode image data by scanning a document with FINE or STD-mode resolution before binary processing.

This embodiment can be applied to a facsimile apparatus which is not provided with the SF-mode resolution. In such a facsimile apparatus, to output STD-mode image data for copying or transmission, a document is scanned with the FINE-mode resolution, and a pixel value is obtained as the mean of the values of two pixels aligned consecutively in the sub-scanning direction, and then the mean pixel values are binarized.

SECOND EMBODIMENT

The second embodiment uses the lowest brightness (the highest optical density) value from among the values of a plurality of pixels aligned consecutively in the sub-scanning direction as a pixel value with a relatively low resolution, while the first embodiment uses the mean of the values of a plurality of pixels aligned consecutively in the sub-scanning direction as a pixel value with a relatively low resolution so as to achieve a high-quality image.

The construction of a facsimile apparatus according to the second embodiment is also illustrated by the block diagram of FIG. 1. The difference from the first embodiment is the method employed by the pixel value determining circuit 114.

The pixel value determining circuit 114 according to the second embodiment determines pixel values by the following operations.

If the STD mode is selected by the resolution select key 503 of the operating unit 106, $$Y_{i,j} = min(X_{i,j}, X_{i,j-1}, X_{i,j-2}, X_{i,j-3})$$

where the operator "min( )" means the smallest of the values in the parentheses. In short, the smallest of the values of four pixels aligned consecutively in the sub-scanning direction is output as a pixel value $Y_{i,j}$.

If the FINE mode is selected, $$Y_{i,j} = min(X_{i,j}, X_{i,j-1})$$

Thus, the smaller of the two actual pixel values is output as a pixel value $Y_{i,j}$.

If the SF mode is selected, $$Y_{i,j} = X_{i,j}$$

Thus, the value input is output as a pixel value $Y_{i,j}$ without being processed.

As described above, the image data read in by scanning a document with the SF-mode resolution is converted to image data according to the selected mode; during operation in the STD mode, by adopting the smallest of the values of four pixels aligned consecutively in the sub-scanning direction as an STD-mode pixel value; in the FINE mode, by adopting the smaller of the values of two pixels aligned consecutively in the sub-scanning direction as an SF-mode pixel value; and in the SF mode, by using each pixel value read in by scanning as an SF-mode pixel value.

Although the second embodiment employs brightness values as input data of the pixel value determining circuit 114, optical density values may instead be employed according to the present invention. In this case, the pixel value determining circuit determines pixel values by the following operations:

If the STD mode is selected, $$Y_{i,j} = max(X_{i,j}, X_{i,j-1}, X_{i,j-2}, X_{i,j-3})$$

If the FINE mode is selected, $$Y_{i,j} = max(X_{i,j}, X_{i,j-1})$$

If the SF mode is selected, $$Y_{i,j} = X_{i,j}$$

The above operator "max( )" means the largest of the values in the parentheses.

As described above, a facsimile apparatus according to the second embodiment performs document-scanning with a resolution of 15.4 lines/mm and copying or transmission with any one of three resolutions, that is, 15.4 lines/mm (SF mode), 7.7 lines/mm (FINE mode) or 3.85 lines/mm (STD mode). During FINE mode, the facsimile apparatus scans a document with the resolution of 15.4 lines/mm, adopts the lower brightness or higher density value of the values of two pixels aligned consecutively in the sub-scanning direction, and binarizes the thus-obtained pixel value. During operation in the STD mode, the facsimile apparatus scans a document with a resolution of 15.4 lines/mm, adopts the lowest brightness or highest density value of the values of four pixels aligned consecutively in the sub-scanning direction, and binarizes the thus-obtained pixel values.

Thus, the facsimile apparatus according to this embodiment enhances the quality of a binary image of FINE and STD-mode resolutions (for example, unfailingly reproduces a fine (or narrow) line), compared with a facsimile apparatus which obtains FINE or STD-mode image data by neglecting some of the lines of image data read in with the SF-mode scanning resolution before binary processing, or a facsimile apparatus which obtains FINE or STD-mode image data by scanning a document at FINE or STD-mode resolution before binary processing.

THIRD EMBODIMENT

The third embodiment is a modification of the first embodiment.

According to the first embodiment, the image data read in with the SF-mode resolution is converted to, for example, STD-mode image data, by the following operation:

$$Y_{i,j} = (X_{i,j-3} + X_{i,j-2} + X_{i,j-1} + X_{i,j})/4$$

where $X_{i,j}$ is a quantized value read from a document, and $Y_{i,j}$ is an STD mode-quantized value. If a document has a narrow line extending in the sub-scanning direction, the values $X_{i,j-3}$, $X_{i,j-2}$, $X_{i,j-1}$ and $X_{i,j}$, which are aligned along the narrow line, are substantially the same, and accordingly, $Y_{i,j}$ substantially equals $X_{i,j}$. Thus, the narrow line will be reproduced. On the other hand, if a document has a narrow line extending in the main scanning direction, that is, a horizontal narrow line, the values $X_{i,j-3}$, $X_{i,j-2}$, $X_{i,j-1}$ and $X_{i,j}$, which are aligned across the narrow line, may well be different from each other, thus giving a reduced value for $Y_{i,j}$, which means a reduced density value. If the value $Y_{i,j}$ is smaller than the binarization threshold, reproduction of the narrow line will not occur.

Even if scanning is performed with a resolution other than the SF-mode resolution, the image quality of a horizontal narrow line deteriorates when converted in the STD mode as long as the same image processing method is employed.

An image processing apparatus according to the third embodiment unfailingly reproduces a horizontal line (extending in the main scanning direction), thus enhancing the quality of a reproduced image.

The third embodiment scans a document with a resolution selected by a user, that is, in the SF mode, the FINE mode or the STD mode, instead of with a fixed, high resolution (SF mode) as in the first and second embodiments. Thereby, the third embodiment can achieve an increased scanning rate with respect to the sub-scanning direction. For example, the scanning rate with respect to the sub-scanning direction during operation in the STD mode can be made four times as great as that in the SF mode.

Figures 7, 8:
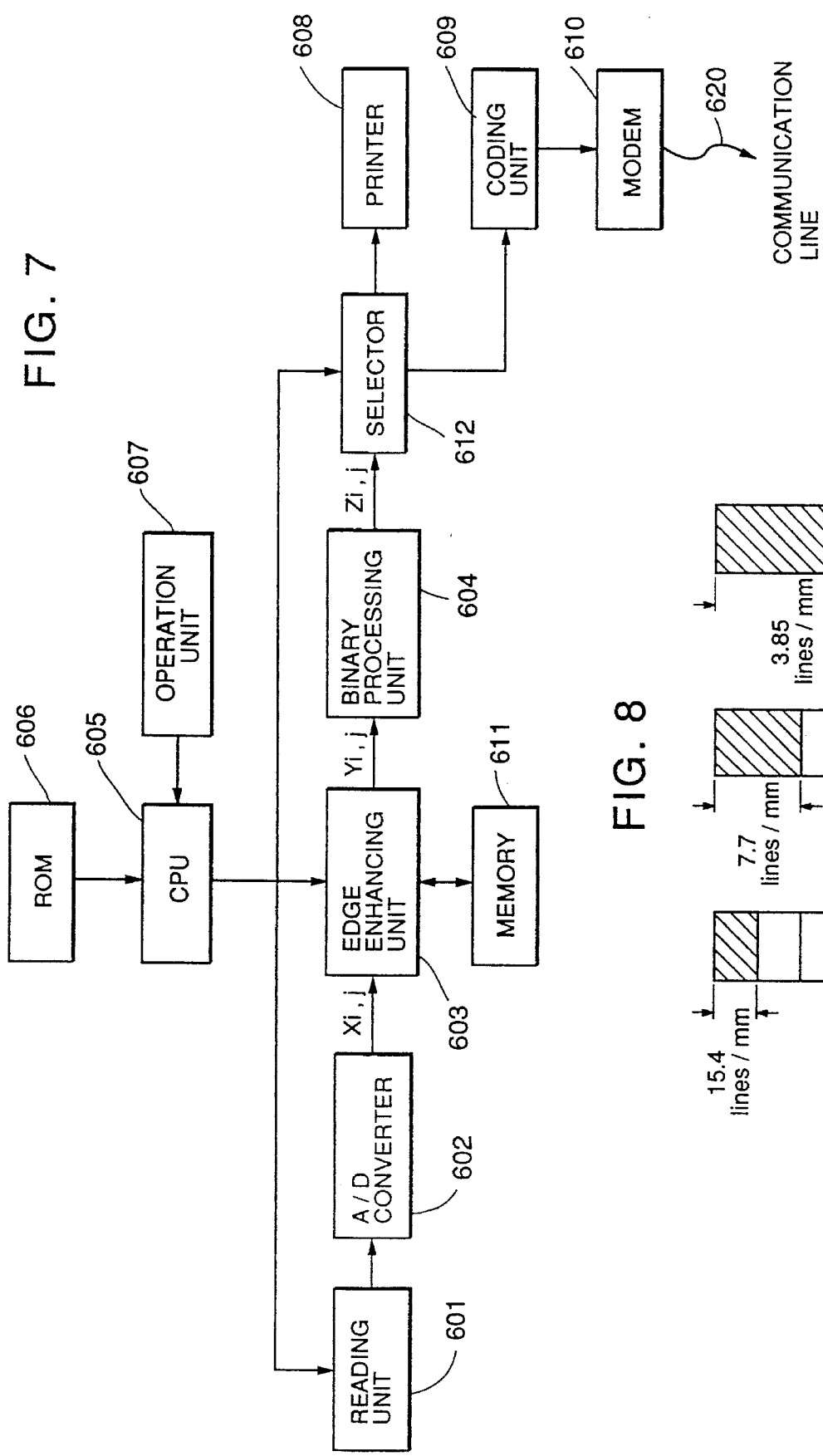
FIG. 7 is a block diagram of a facsimile apparatus according to third and fourth embodiments of the present invention.
FIG. 8 illustrates the reading areas to be used during operation in the SF mode, the FINE mode and the STD mode.

A facsimile apparatus according to the third embodiment is illustrated by the block diagram of FIG. 7. The facsimile apparatus comprises: a reading unit 601; an A/D converter 602; a binary processing unit 604; a CPU 605 for controlling the entire apparatus; a ROM 606 storing various programs for the CPU 605 to operate; an operating unit 607 having a display and keys for a user to input various instructions; a selector 612; a printer 608; a coding unit 609; a modem 610 enabling communication with a network via a communication line 620; FIFO memory (referred to as "memory" hereinafter) 611; and an edge enhancing unit 603.

The operating unit 607 according to this embodiment has a select key for selecting a scanning resolution.

While the first and second embodiments each determine a pixel value $Y_{i,j}$ by using the memories 111 to 113 and the pixel value determining circuit 114, the third embodiment determines a pixel value $Y_{i,j}$ by using the memory 611 and the edge enhancing unit 603.

The operation of the facsimile according to the third embodiment will now be described.

The reading unit 601 scans a document with a fixed resolution of 8 dots/mm in the main scanning direction and a selective resolution of 15.4 lines/mm (SF mode), 7.7 lines/mm (FINE mode) or 3.85 lines/mm (STD mode) in the sub-scanning direction. If the FINE mode is selected, the reading unit 601 conveys a document in the sub-scanning direction at a conveyance rate twice the conveyance rate used in the SF mode. If the STD mode is selected, the reading unit 601 conveys a document in the sub-scanning direction at a conveyance rate four times the conveyance rate used during operation in the SF mode. FIG. 8 illustrates the areas (shadowed areas) which can be scanned in a given period of time in the three modes.

The A/D converter 602 quantizes image data read by the reading unit 601 into 6-bit digital signals.

A signal $X_{i,j}$ quantized into 6 bits by the A/D converter 602 is sent to the edge enhancing unit 603, which corrects the space frequency of the image read by the reading unit 602. The edge-enhanced signal $Y_{i,j}$ is obtained by processing on the basis of the following formula:

$$Y_{i,j} = X_{i,j} + A(2X_{i,j} - (X_{i-1,j} + X_{i+1,j})) + B(2X_{i,j} - (X_{i,j-1} + X_{i,j+1}))$$

Figure 9:
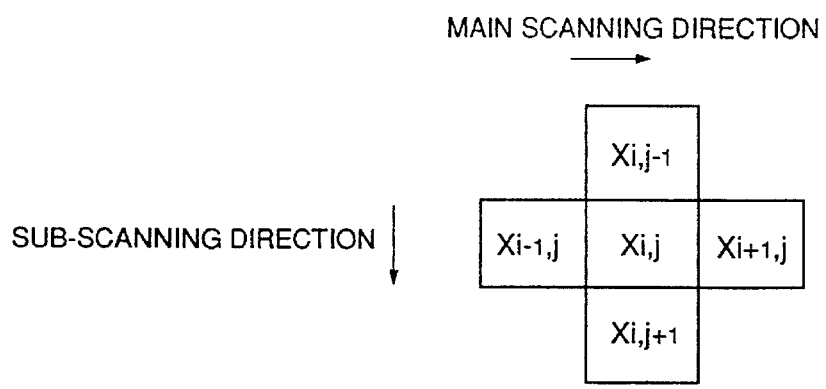
FIG. 9 illustrates edge-enhancement processing.

The coordinate positions of these X's are shown in FIG. 9. The coefficients A, B vary depending on scanning resolutions. If the resolution select key (503 in FIG. 5) of the operating unit 607 is positioned at:

SF, then A=¼, and B=¼;
FINE, then A=¼, and B=½; or
STD, then A=¼, and B=1.

The selected coefficients are transferred to the edge enhancing unit 603 by the CPU 605.

The memory 611 is capable of storing 6-bit image data of two scanning lines, in cooperation with the edge enhancing unit 603.

The edge-enhanced signal $Y_{i,j}$ is sent to the binary processing unit 604, which compresses the data $Y_{i,j}$ into black/white binary data by using a threshold TH. A binarized signal $Z_{i,j}$ is obtained by the same operation as employed in the first embodiment. The signal $Z_{i,j}$ output from the binary processing unit 604 is processed in substantially the same manner as in the first embodiment.

As described above, according to the third embodiment, when the scanning resolution with respect to the sub-scanning direction is reduced (that is, during operation in the FINE or STD mode), the coefficient B, which determines the amount of edge with respect to the sub-scanning direction to be added to the pixel value of an object pixel, is shifted to a value larger than the coefficient A so that the amount of edge with respect to the sub-scanning direction to be added to each object pixel becomes larger than the amount of edge with respect to the main scanning direction to be added to the same pixel. Thus, a facsimile apparatus according to this embodiment is able to achieve a high-quality image and, more particularly, can unfailingly reproduce a horizontal line (extending in the main scanning direction) even in a low resolution mode.

Although the third embodiment employs the values ¼, ½ and 1 for the coefficient B, other values may be used for the coefficient B according to the present invention.

FOURTH EMBODIMENT

While the third embodiment scans a document with a resolution with respect to the main scanning direction fixed at 8 dots/mm and with a resolution with respect to the sub-scanning direction selected from the values 15.4 lines/mm, 7.7 lines/m, and 3.85 lines/mm, a G4 facsimile apparatus in general scans a document with a selective resolution of either 400 dpi (dots per inch) or 200 dpi with respect to the main scanning direction.

Resolution conversion with respect to the main scanning direction will be considered below, in a manner comparable to the resolution conversion with respect to the sub-scanning direction of the first embodiment.

A value $Y_{i,j}$ obtained by quantizing the image information carried by a document with a resolution of 200 dpi can substantially be expressed by a value $X_{i,j}$ obtained by quantizing the same image information with a resolution of 400 dpi as follows:

$$Y_{i,j}=(X_{i-1,j}+X_{i,j})/2$$

If a document has a narrow line extending in the main scanning direction, the values $X_{i-1,j}$ and $X_{i,j}$, which are aligned along the line, are substantially the same and, accordingly, $Y_{i,j}$ substantially equals $X_{i,j}$. Thus, the narrow line will be reproduced. On the other hand, if a document has a narrow line extending in the sub-scanning direction, that is, a vertical narrow line, the values $X_{i-1}$ and $X_{i,j}$, which are aligned across the narrow line, may well be different from each other, thus giving a reduced value for $Y_{i,j}$, which means a reduced density value. If the value $Y_{i,j}$ is smaller than the binarization threshold, reproduction of the narrow line will not occur.

Even if scanning is performed with a resolution other than 400 dpi, the image quality of a vertical narrow line deteriorates when converted in a low resolution mode as long as the same image processing method is employed.

A facsimile apparatus according to the fourth embodiment scans a document with a main scanning direction-resolution selected from 400 dpi or 200 dpi, and is able to achieve an enhanced image quality and, more particularly, can unfailingly reproduce a vertical line (extending in the sub-scanning direction) even during operation in the 200-dpi mode.

The overall construction of the facsimile apparatus according to this embodiment is substantially the same as the construction according to the third embodiment and, therefore, is illustrated by the block diagram of FIG. 6.

An operating unit according to the fourth embodiment, which is different from that of the third embodiment, will be described with reference to FIG. 10.

Figure 10:
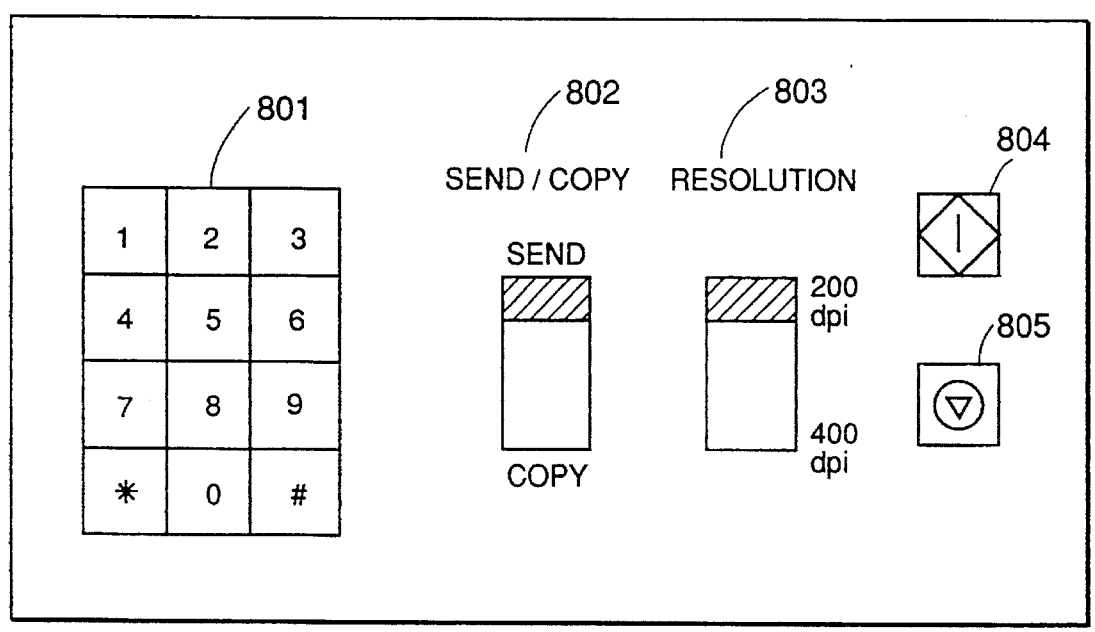
FIG. 10 is a plan view of the exterior of the operating unit of a facsimile apparatus according to the fourth embodiment of the present invention.

FIG. 10 is a top plan view of the exterior of the operating unit according to the fourth embodiment. The operating unit has: a ten-key pad 801; an operation select key 802 for selecting either a send mode or a copy mode; a resolution select key 803 for selecting a scanning resolution, that is, either 200 dpi or 400 dpi; a start key 804; and a stop key 805.

If the resolution selected by the resolution select key 803 is:

400 dpi, then A=¼, and B=¼; or 200 dpi, then A=½, and B=¼.

The selected coefficients A, B are transferred to the edge-enhancing unit by the CPU.

After this stage, the image data are processed in substantially the same manner as described in the first and third embodiments.

According to the fourth embodiment, when the scanning resolution with respect to the main scanning direction is reduced (that is, 200 dpi), the coefficient A, which determines the amount of edge with respect to the main scanning direction to be added to the pixel value of the object pixel, is shifted to a value larger than the coefficient B so that the amount of edge with respect to the main scanning direction to be added to each object pixel becomes larger than the amount of edge with respect to the sub-scanning direction to be added to the same pixel. Thus, a facsimile apparatus according to this embodiment is able to achieve a high-quality image and, more particularly, can unfailingly reproduce a vertical line (extending in the sub-scanning direction) even when document scanning is performed with a low resolution.

Although the fourth embodiment employs the values ¼ and ½ for the coefficient A, other values may be used for the coefficient A according to the present invention.

The present invention may be applied to either a system comprising a plurality of apparatuses or a single apparatus. Further, the present invention can also be achieved by installing a program according to this invention in a system of one or more apparatuses.

As described above, the image processing method and apparatus of the present invention achieve high-quality image data for either copying or transmission without deterioration of image quality even when a low-resolution mode is selected.

Further, the image processing method and apparatus of the present invention can enhance the image quality of a vertical and/or horizontal line (extending in sub- and/or main scanning directions).

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. An image processing apparatus comprising:

select means for selecting one of a first resolution and a second resolution with respect to a sub-scanning direction, said first resolution being higher than said second resolution;

input means for inputting image data with whichever of said first resolution and said second resolution is selected;

edge enhancing means for edge-enhancing image data input by said input means; and quantizing means for quantizing image data edge-enhanced by said edge enhancing means, wherein, when said second resolution is selected, said edge enhancing means increases the amount of edge enhancement with respect to the sub-scanning direction to an amount that is larger than the amount of edge enhancement with respect to a main scanning direction.

2. An image processing apparatus according to claim 1, wherein said input means includes reading means for reading a document image and output means for outputting image data.

3. An image processing apparatus according to claim 1, wherein said quantizing means quantizes edge-enhanced image data into binary data.

4. An image processing apparatus according to claim 3, further comprising transmission means for transmitting binary data output by said quantizing means.

5. An image processing apparatus comprising:

select means for selecting one of a first resolution and a second resolution with respect to a main scanning direction, said first resolution being higher than said second resolution;

input means for inputting image data with whichever of said first resolution and said second resolution is selected;

edge enhancing means for edge-enhancing image data input by said input means; and quantizing means for quantizing image data edge-enhanced by said edge enhancing means, wherein, when said second resolution is selected, said edge enhancing means increases the amount of edge enhancement with respect to the main scanning direction to an amount that is larger than the amount of edge enhancement with respect to a sub-scanning direction.

6. An image processing apparatus according to claim 5, wherein said input means includes reading means for reading a document image and output means for outputting image data.

7. An image processing apparatus according to claim 5, wherein said quantizing means quantizes edge-enhanced image data into binary data.

8. An image processing apparatus according to claim 7, further comprising transmission means for transmitting binary data output by said quantizing means.

9. An image processing apparatus according to claim 5, wherein said first resolution is 400 dpi (dots per inch) and said second resolution is 200 dpi.

10. An image processing method comprising the steps of:

selecting one of a first resolution and a second resolution with respect to the sub-scanning direction, the first resolution being higher than the second resolution;

inputting image data with whichever of the first resolution and the second resolution is selected;

edge-enhancing image data input in said inputting step; and quantizing image data edge-enhanced in said edge enhancing step, wherein, when the second resolution is selected, the amount of edge enhancement with respect to the sub-scanning direction is increased in said edge enhancing step to an amount that is larger than the amount of edge enhancement with respect to a main scanning direction.

* * * * *

UNITED STATES PATENT AND TRADEMARK OFFICE
CERTIFICATE OF CORRECTION

PATENT NO. : 5,594,555
DATED : January 14, 1997
INVENTOR : SHINICHI ISHIDA

It is certified that error appears in the above-identified patent and that said Letters Patent is hereby corrected as shown below:

ON TITLE PAGE, item [54]

Title   "EMPOLYING" should read --EMPLOYING--.

COLUMN 1

Line 2,   "EMPOLYING" should read --EMPLOYING--.

COLUMN 2

Line 1,   "directionxa" should read --direction x a--.

COLUMN 5

Line 4,   "circuit 1114." should read --circuit 114.--.

Signed and Sealed this

Sixth Day of January, 1998

Attest:

BRUCE LEHMAN

*Attesting Officer*      *Commissioner of Patents and Trademarks*